US009007702B2

(12) United States Patent
Tsai

(10) Patent No.: US 9,007,702 B2
(45) Date of Patent: Apr. 14, 2015

(54) FIVE-PIECE OPTICAL LENS SYSTEM

(71) Applicant: Newmax Technology Co., Ltd., Taichung (TW)

(72) Inventor: Fei-Hsin Tsai, Taichung (TW)

(73) Assignee: Newmax Technology Co., Ltd., Taichung (TW)

(*) Notice: Subject to any disclaimer, the term of this patent is extended or adjusted under 35 U.S.C. 154(b) by 75 days.

(21) Appl. No.: 13/783,340

(22) Filed: Mar. 3, 2013

(65) Prior Publication Data

US 2014/0247509 A1 Sep. 4, 2014

(51) Int. Cl.
*G02B 13/04* (2006.01)
*G02B 13/00* (2006.01)

(52) U.S. Cl.
CPC .................................. *G02B 13/0045* (2013.01)

(58) Field of Classification Search
CPC ...... G02B 13/04; G02B 13/18; G02B 13/002; G02B 13/0045; G02B 9/58; G02B 9/60; G02B 23/243
USPC ........... 359/659, 708, 714, 746, 75, 754, 763, 359/770
See application file for complete search history.

(56) References Cited

U.S. PATENT DOCUMENTS 4,033,675 A * 7/1977 Terasawa et al. ............ 359/753
4,525,038 A * 6/1985 Muller .......................... 359/753
4,647,161 A * 3/1987 Muller .......................... 359/753
5,870,234 A * 2/1999 Ebbesmeier .................. 359/752
5,933,286 A * 8/1999 Yamada et al. ............... 359/770
7,684,127 B2 * 3/2010 Asami ........................... 359/770
7,852,572 B2 * 12/2010 Robinson ...................... 359/753
8,928,999 B1 * 1/2015 Lee .............................. 359/714
2009/0009888 A1 * 1/2009 Asami ........................... 359/770
2009/0251801 A1 * 10/2009 Jung et al. ..................... 359/708
2009/0296234 A1 * 12/2009 Asami ........................... 359/713
2011/0102541 A1 * 5/2011 Jin et al. .......................... 348/36
2011/0122512 A1 * 5/2011 Asami ........................... 359/753
2011/0169912 A1 * 7/2011 Abe et al. ........................ 348/36
2012/0026285 A1 * 2/2012 Yoshida et al. ................. 348/36
2012/0194921 A1 * 8/2012 Jung et al. ..................... 359/715
2014/0307334 A1 * 10/2014 Chen ............................ 359/714

* cited by examiner

*Primary Examiner* — Scott J Sugarman
*Assistant Examiner* — Collin X Beatty
(74) *Attorney, Agent, or Firm* — Patent Office of Bang Shia

(57) ABSTRACT

A five-piece optical lens system comprises, in order from the object side to the image side: a first lens element with a negative refractive power having a convex object-side surface; a second lens element with a negative refractive power having a concave image-side surface; a third lens element with a positive refractive power having a convex object-side surface; a stop; a fourth lens element with a positive refractive power having a convex image-side surface; a fifth lens element with a negative refractive power having a concave object-side surface, each of the second, third, fourth and fifth lens elements has at least one aspheric surface. Thereby, such a system has a wide field of view and can improve the yield rate when being applied to biomedicine, car recorder, camera or other electronic products.

8 Claims, 4 Drawing Sheets object side image side 110 120 130 140 150 100 180 160 112 141 132 131 122 121 142 151 152 170 111

FIVE-PIECE OPTICAL LENS SYSTEM

BACKGROUND OF THE INVENTION

1. Field of the Invention

The present invention relates to an optical lens system, and more particularly to a five-piece optical lens system.

2. Description of the Prior Art

The electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and optical lens systems have increasingly higher resolution. Therefore, there's an increasing demand for an imaging lens system with better image quality.

However, as to the optical lens systems used in biomedicine, car recorder, camera or other electronic products, the requirement for high pixel and big stop needn't be stringent, but the problems of field of view and yield rate are needed to be solved. Conventional lens systems used in the electronic products in the above-mentioned fields mostly consist of four lens elements, however, such lens systems have some defects, such as, the field of view is small, the yield rate is low and so on.

The present invention mitigates and/or obviates the aforementioned disadvantages.

SUMMARY OF THE INVENTION

The primary objective of the present invention is to provide a five-piece optical lens system which has a wide field of view and can improve the yield rate.

A five-piece optical lens system in accordance with the present invention comprises, in order from the object side to the image side: a first lens element with a negative refractive power having a convex object-side surface; a second lens element with a negative refractive power having a concave image-side surface, at least one of an object-side and the image-side surfaces of the second lens element being aspheric; a third lens element with a positive refractive power having a convex object-side surface, at least one of the object-side and an image-side surfaces of the third lens element being aspheric; a stop; a fourth lens element with a positive refractive power having a convex image-side surface, at least one of an object-side and the image-side surfaces of the fourth lens element being aspheric; and a fifth lens element with a negative refractive power having a concave object-side surface, at least one of the object-side and an image-side surfaces of the fifth lens element being aspheric.

According to one aspect of the present five-piece optical lens system, the focal length of the first lens element is f1, the focal length of the second lens element is f2, and they satisfy the relation: $2.5<|f1|/|f2|<6$. If $|f1|/|f2|$ satisfies the above relation, a wide field of view and high yield rate can be provided. Contrarily, If $|f1|/|f2|$ exceeds the above range, the performance of the optical lens system will be reduced, and the yield rate will be low.

According to another aspect of the present five-piece optical lens system, the focal length of the second lens element is f2, the focal length of the third lens element is f3, and they satisfy the relation: $0.3<|f2|/|f3|<1$. If $|f2|/|f3|$ satisfies the above relation, a wide field of view and high yield rate can be provided. Contrarily, If $|f2|/|f3|$ exceeds the above range, the performance of the optical lens system will be reduced, and the yield rate will be low.

According to another aspect of the present five-piece optical lens system, the focal length of the third lens element is f3, the focal length of the fourth lens element is f4, and they satisfy the relation: $1.0<|f3|/|f4|<3.0$. If $|f3|/|f4|$ satisfies the above relation, a wide field of view and high yield rate can be provided. Contrarily, If $|f3|/|f4|$ exceeds the above range, the performance and resolution of the optical lens system will be reduced, and the yield rate will be low.

According to another aspect of the present five-piece optical lens system, the focal length of the fourth lens element is f4, the focal length of the fifth lens element is f5, and they satisfy the relation: $|f4|/|f5|<0.7$. If $|f4|/|f5|$ satisfies the above relation, a wide field of view and high yield rate can be provided. Contrarily, if $|f4|/|f5|$ exceeds the above range, the performance of the optical lens system will be reduced, and the yield rate will be low.

According to another aspect of the present five-piece optical lens system, the focal length of the first lens element, the second lens element and the third lens element combined is f123, the focal length of the five-piece optical lens system is f, and they satisfy the relation: $1<|f123|/|f<3$. If $|f123|/|f|$ satisfies the above relation, a wide field of view and high yield rate can be provided. Contrarily, if $|f123|/|f|$ exceeds the above range, the performance of the optical lens system will be reduced, and the yield rate will be low.

According to another aspect of the present five-piece optical lens system, the focal length of the first lens element is f1, the focal length of the second lens element and the third lens element combined is f23, and they satisfy the relation: $0.5<|f1|/|f23|<2.3$. If $|f1|/|f23|$ satisfies the above relation, a wide field of view and high yield rate can be provided. Contrarily, if $|f1|/|f23|$ exceeds the above range, the performance of the optical lens system will be reduced, and the yield rate will be low.

According to another aspect of the present five-piece optical lens system, the focal length of the five-piece optical lens system is f, the distance from the object-side surface of the first lens element to the image plane along the optical axis is TL, and they satisfy the relation: $|f/TL|<0.4$. If $|f/TL|$ satisfies the above relation, a wide field of view and high yield rate can be provided. Contrarily, if $|f/TL|$ exceeds the above range, the performance of the optical lens system will be reduced, and the yield rate will be low.

According to another aspect of the present five-piece optical lens system, the first lens element is made of plastic and has a concave image-side surface, and the object-side surface and the image-side surface of the first lens element are aspheric. The second lens element is made of plastic and has a convex object-side surface, and the object-side surface and the image-side surface of the second lens element are aspheric. The third lens element is made of plastic and has a concave image-side surface, and the object-side surface and the image-side surface of the third lens element are aspheric. The fourth lens element is made of plastic and has a convex object-side surface, and the object-side surface and the image-side surface of the fourth lens element are aspheric. The fifth lens element is made of plastic and has a convex image-side surface, and the object-side surface and the image-side surface of the fifth lens element are aspheric.

According to another aspect of the present five-piece optical lens system, the first lens element is made of glass and has a concave image-side surface, and the object-side surface and the image-side surface of the first lens element are aspheric. The second lens element is made of plastic and has a concave object-side surface, and the object-side surface and the image-side surface of the second lens element are aspheric. The third lens element is made of plastic and has a concave image-side surface, and the object-side surface and the image-side surface of the third lens element are aspheric. The fourth lens element is made of plastic and has a convex object-side surface, and the object-side surface and the image-side surface of the fourth lens element are aspheric. The fifth lens element is made of plastic and has a convex image-side surface, and the object-side surface and the image-side surface of the fifth lens element are aspheric.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
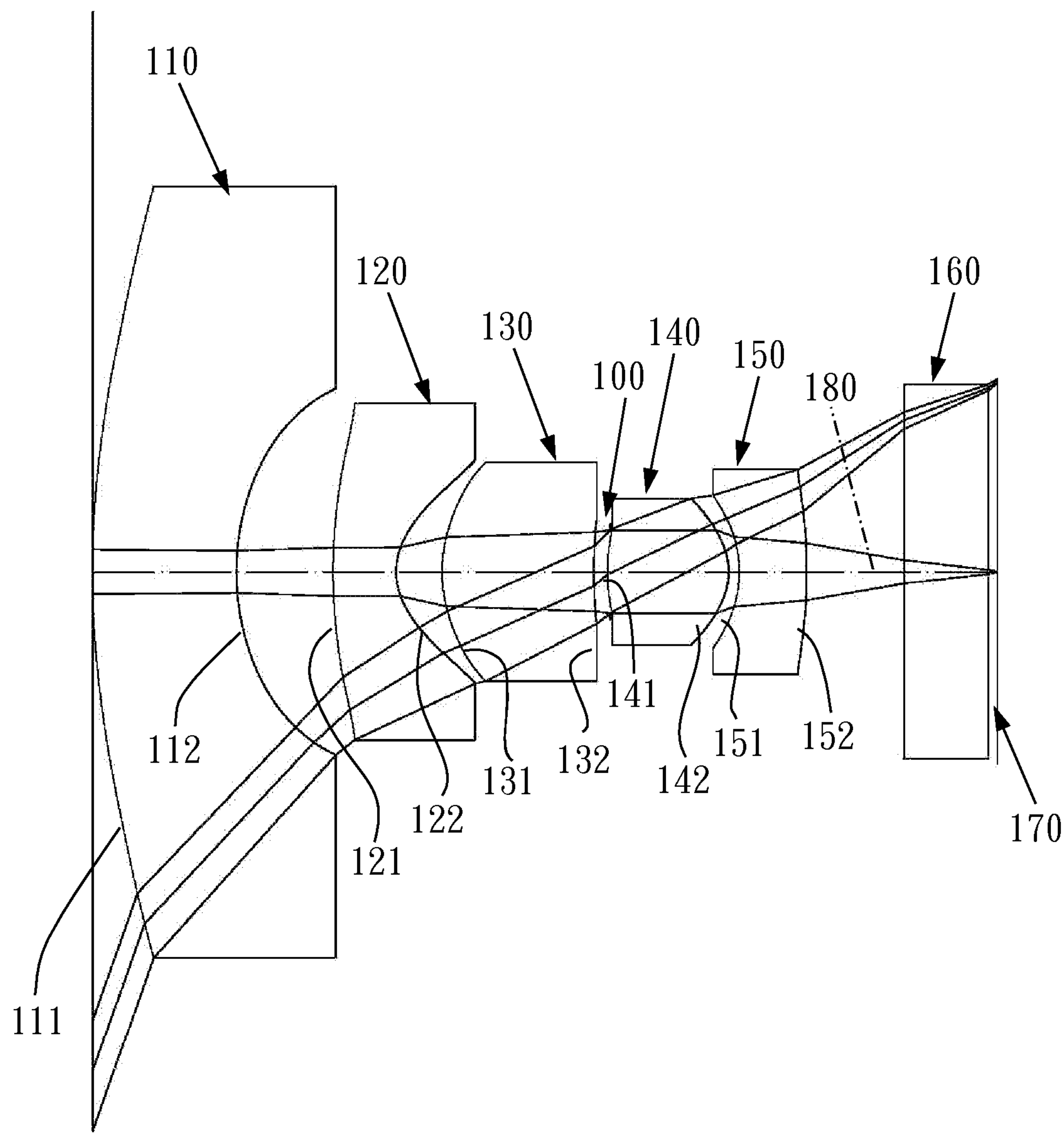
FIG. 1A shows an optical lens system in accordance with a first embodiment of the present invention.
Figure 1B:
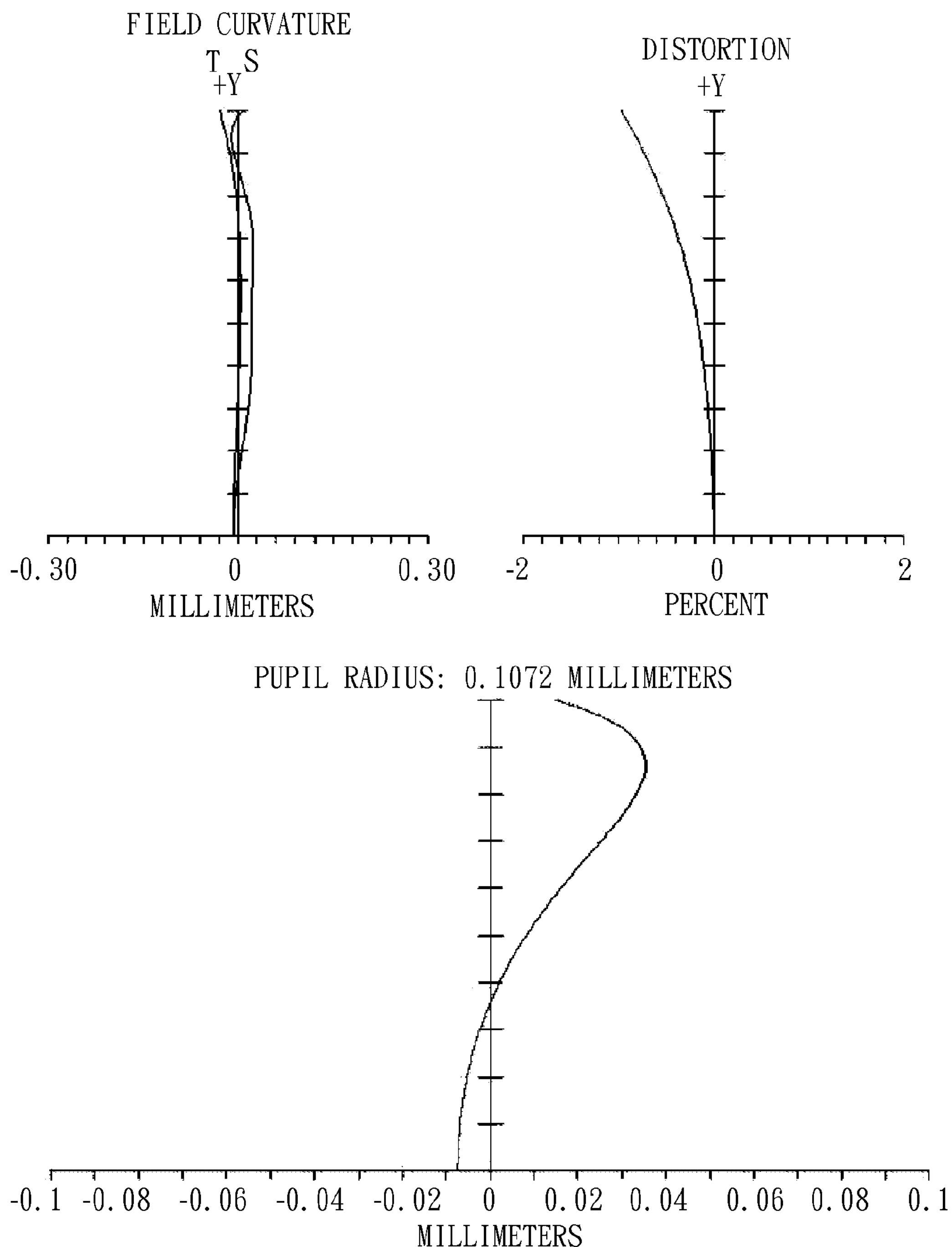
FIG. 1B shows the longitudinal spherical aberration curve, the distortion curve, and the image plane curve of the first embodiment of the present invention.

Referring to FIG. 1A, which shows a five-piece optical lens system in accordance with a first embodiment of the present invention, and FIG. 1B shows the longitudinal spherical aberration curves, the astigmatic field curves, and the distortion curve of the first embodiment of the present invention. A five-piece optical lens system in accordance with the first embodiment of the present invention comprises, in order from the object side to the image side:

A first lens element 110 with a negative refractive power made of plastic has a convex object-side surface 111 and a concave image-side surface 112, and the object-side surface 111 and the image-side surface 112 of the first lens element 110 are aspheric.

A second lens element 120 with a negative refractive power made of plastic has a convex object-side surface 121 and a concave image-side surface 122, and the object-side surface 121 and the image-side surface 122 of the second lens element 120 are aspheric.

A third lens element 130 with a positive refractive power made of plastic has a convex object-side surface 131 and a concave image-side surface 132, and the object-side surface 131 and the image-side surface 132 of the third lens element 130 are aspheric.

A stop 100.

A fourth lens element 140 with a positive refractive power made of plastic has a convex object-side surface 141 and a convex image-side surface 142, and the object-side surface 141 and the image-side surface 142 of the fourth lens element 140 are aspheric.

A fifth lens element 150 with a negative refractive power made of plastic has a concave object-side surface 151 and a convex image-side surface 152, and the object-side surface 151 and the image-side surface 152 of the fifth lens element 150 are aspheric.

An IR cut filter 160 made of glass is located between the image-side surface 152 of the fifth lens element 150 and an image plane 170 and has no influence on the focal length of the five-piece optical lens system.

The equation for the aspheric surface profiles of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 180;

k represents the conic constant;

c represents the reciprocal of the radius of curvature;

A, B, C, D, E, G, . . . : represent the high-order aspheric coefficients.

In the first embodiment of the present five-piece optical lens system, the focal length of the five-piece optical lens system is f, and it satisfies the relation:

$$f=0.61.$$

In the first embodiment of the present five-piece optical lens system, the f-number of the five-piece optical lens system is Fno, and it satisfies the relation:

$$Fno=2.8.$$

In the first embodiment of the present five-piece optical lens system, the field of view of the five-piece optical lens system is 2ω, and it satisfies the relation:

$$2\omega=141°.$$

In the first embodiment of the present five-piece optical lens system, the focal length of the first lens element 110 is f1, the focal length of the second lens element 120 is f2, and they satisfy the relation:

$$|f1|/|f2|=5.0064.$$

In the first embodiment of the present five-piece optical lens system, the focal length of the second lens element 120 is f2, the focal length of the third lens element 130 is f3, and they satisfy the relation:

$$|f2|/|f3|=0.571.$$

In the first embodiment of the present five-piece optical lens system, the focal length of the third lens element 130 is f3, the focal length of the fourth lens element 140 is f4, and they satisfy the relation:

$$|f3|/|f4|=2.4828.$$

In the first embodiment of the present five-piece optical lens system, the focal length of the fourth lens element 140 is f4, the focal length of the fifth lens element 150 is f5, and they satisfy the relation:

$$|f4|/|f5|=0.519.$$

In the first embodiment of the present five-piece optical lens system, the focal length of the first lens element 110, the second lens element 120 and the third lens element 130 combined is f123, the focal length of the five-piece optical lens system is f, and they satisfy the relation:

$$|f123|/|f|=1.907.$$

In the first embodiment of the present five-piece optical lens system, the focal length of the first lens element 110 is f1, the focal length of the second lens element 120 and the third lens element 130 combined is f23, and they satisfy the relation:

$$|f1|/|f23|=1.8115.$$

In the first embodiment of the present five-piece optical lens system, the focal length of the five-piece optical lens system is f, the distance from the object-side surface 111 of the first lens element 110 to the image plane 170 along the optical axis 180 is TL, and they satisfy the relation:

$|f/TL|=0.1427.$

The detailed optical data of the first embodiment is shown in table 1, and the aspheric surface data is shown in table 2, wherein the units of the radius of curvature, the thickness and the focal length are expressed in mm. In the tables 1 and 2, the surfaces 1 and 2 represent the object-side surface 111 and the image-side surface 112 of the first lens element 110, respectively, the surfaces 3 and 4 represent the object-side surface 121 and the image-side surface 122 of the second lens element 120, respectively, the surfaces 5 and 6 represent the object-side surface 131 and the image-side surface 132 of the third lens element 130, respectively, the surfaces 8 and 9 represent the object-side surface 141 and the image-side surface 142 of the fourth lens element 140, respectively, and the surfaces 10 and 11 represent the object-side surface 151 and the image-side surface 152 of the fifth lens element 150, respectively.

TABLE 1

| (Embodiment 1) f(focal length) = 0.61 mm, Fno = 2.8, 2ω = 141°. | | | | | | |
|---|---|---|---|---|---|---|
| Surface | | Curvature Radius | Thickness | Material | nd | vd |
| 0 | Object | Infinity | 500 | | | |
| 1 | Lens 1 | 4.41938(ASP) | 0.68489 | Plastic | 1.535 | 56 |
| 2 | | 1.25089(ASP) | −0.45826 | | | |
| 3 | Lens 2 | 2.58748(ASP) | 0.29987 | Plastic | 1.565 | 56 |
| 4 | | 0.31571(ASP) | 0.2185 | | | |
| 5 | Lens 3 | 0.68931(ASP) | 0.72166 | Plastic | 1.634 | 23.9 |
| 6 | | 3.23146(ASP) | 0.07748 | | | |
| 7 | Stop | Infinity | −0.0138 | | | |
| 8 | Lens 4 | 0.85198(ASP) | 0.57669 | Plastic | 1.535 | 56 |
| 9 | | −0.2952(ASP) | 0.05008 | | | |
| 10 | Lens 5 | −0.5069ASP) | 0.31932 | Plastic | 1.634 | 23.9 |
| 11 | | −3.6892(ASP) | 0.46175 | | | |
| 12 | IR-filter | Infinity | 0.4 | Glass | 1.5168 | 64.1673 |
| 13 | | Infinity | 0.045 | | | |
| 14 | Image | Infinity | | | | |

TABLE 2

| Aspheric Coefficients | | | | | |
|---|---|---|---|---|---|
| | Surface | | | | |
| | 1 | 2 | 3 | 4 | 5 |
| K = | 2.272235 | 0.383822 | 4.908257 | −0.76256 | −0.11158 |
| A = | −0.01443 | 0.102645 | −0.07697 | −1.08 | −0.24825 |
| B = | −0.0006 | −0.102 | 0.102816 | −1.48816 | −0.67233 |
| C = | 0.000163 | −0.00875 | −0.04276 | −12.5522 | −0.47874 |
| D = | 2.6E−07 | 0.31355 | −0.3153 | 8.308509 | 12.62426 |
| | Surface | | | | |
| | 6 | 8 | 9 | 10 | 11 |
| K = | −360 | −2.01454 | −0.679 | −4.36488 | 3.434523 |
| A = | 5.178583 | 0.314421 | 8.70778 | 1.409741 | −0.52002 |
| B = | −67.7769 | 27.15316 | −86.3479 | −53.4321 | 3.358731 |
| C = | 546.8936 | −792.666 | 511.4431 | 307.2865 | −16.5457 |
| D = | 517.2056 | 10057.47 | −857.918 | −366.686 | 46.29979 |

Figure 2A:
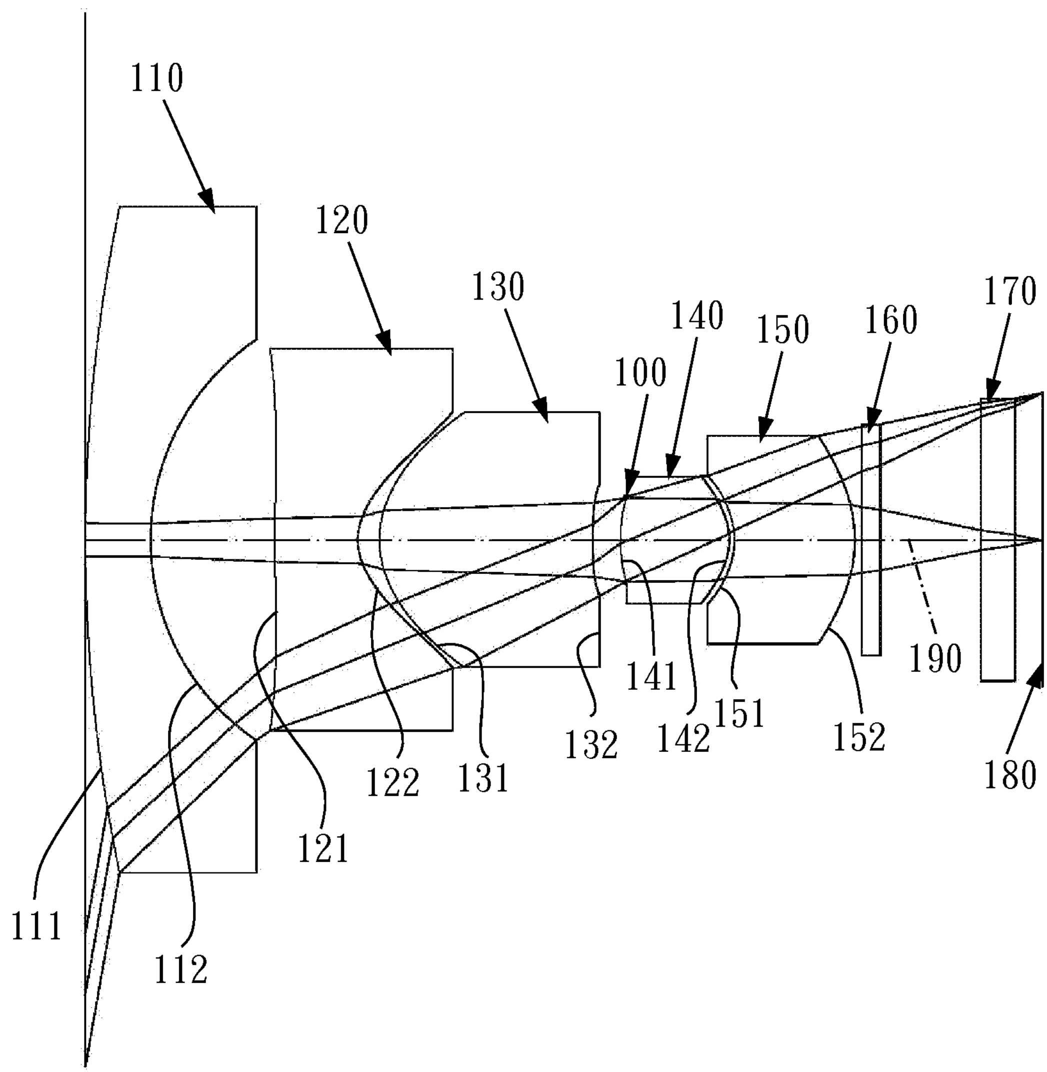
FIG. 2A shows an optical lens system in accordance with a second embodiment of the present invention.
Figure 2B:
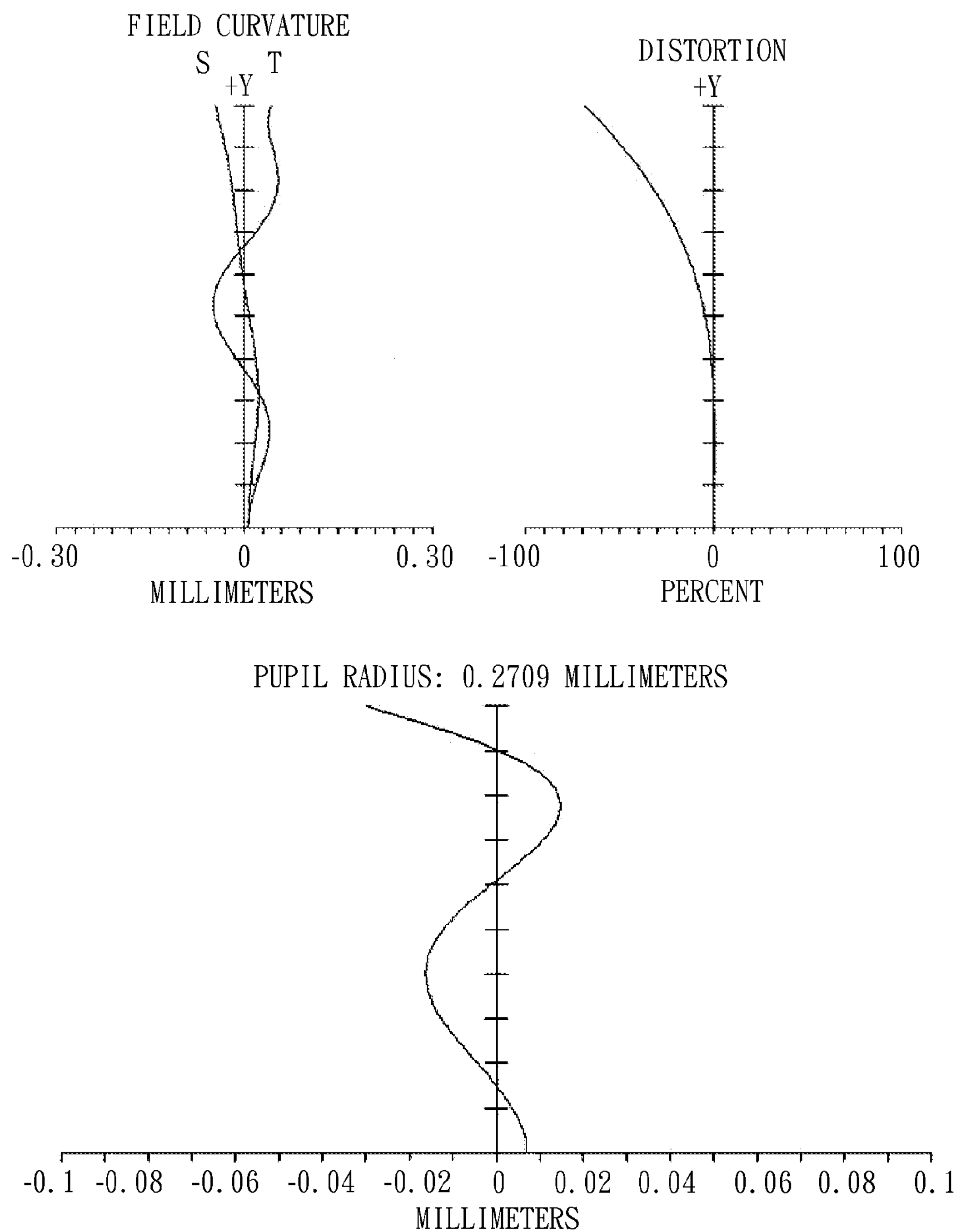
FIG. 2B shows the longitudinal spherical aberration curve, the distortion curve, and the image plane curve of the second embodiment of the present invention.

Referring to FIG. 2A, which shows a five-piece optical lens system in accordance with a second embodiment of the present invention, and FIG. 2B shows the longitudinal spherical aberration curves, the astigmatic field curves, and the distortion curve of the second embodiment of the present invention. A five-piece optical lens system in accordance with the second embodiment of the present invention comprises, in order from the object side to the image side:

A first lens element 210 with a negative refractive power made of glass has a convex object-side surface 211 and a concave image-side surface 212, and the object-side surface 211 and the image-side surface 212 of the first lens element 210 are aspheric.

A second lens element 220 with a negative refractive power made of plastic has a concave object-side surface 221 and a concave image-side surface 222, and the object-side surface 221 and the image-side surface 222 of the second lens element 220 are aspheric.

A third lens element 230 with a positive refractive power made of plastic has a convex object-side surface 231 and a concave image-side surface 232, and the object-side surface 231 and the image-side surface 232 of the third lens element 230 are aspheric.

A stop 200.

A fourth lens element 240 with a positive refractive power made of plastic has a convex object-side surface 241 and a convex image-side surface 242, and the object-side surface 241 and the image-side surface 242 of the fourth lens element 240 are aspheric.

A fifth lens element 250 with a negative refractive power made of plastic has a concave object-side surface 251 and a convex image-side surface 252, and the object-side surface 251 and the image-side surface 252 of the fifth lens element 250 are aspheric.

An IR cut filter 260 made of glass is located between the image-side surface 252 of the fifth lens element 250 and an image plane 270 and has no influence on the focal length of the five-piece optical lens system.

A cover glass 290 made of glass is located between the IR cut filter 260 and the image plane 270 to protect a sensor (not shown), and has no influence on the focal length of the optical lens system with a wide field of view.

The equation for the aspheric surface profiles of the second embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 280;

k represents the conic constant;

c represents the reciprocal of the radius of curvature;

A, B, C, D, E, G, . . . : represent the high-order aspheric coefficients.

In the second embodiment of the present five-piece optical lens system, the focal length of the five-piece optical lens system is f, and it satisfies the relation:

$f$=1.34.

In the second embodiment of the present five-piece optical lens system, the f-number of the five-piece optical lens system is Fno, and it satisfies the relation:

Fno=2.4.

In the second embodiment of the present five-piece optical lens system, the field of view of the five-piece optical lens system is 2ω, and it satisfies the relation:

2ω=160°.

In the second embodiment of the present five-piece optical lens system, the focal length of the first lens element 210 is f1, the focal length of the second lens element 220 is f2, and they satisfy the relation:

$|f1|/|f2|$=3.553.

In the second embodiment of the present five-piece optical lens system, the focal length of the second lens element 220 is f2, the focal length of the third lens element 230 is f3, and they satisfy the relation:

$|f2|/|f3|$0.727.

In the second embodiment of the present five-piece optical lens system, the focal length of the third lens element 230 is f3, the focal length of the fourth lens element 240 is f4, and they satisfy the relation:

$|f3|/|f4|$=1.6495.

In the second embodiment of the present five-piece optical lens system, the focal length of the fourth lens element 240 is f4, the focal length of the fifth lens element 250 is f5, and they satisfy the relation:

$|f4|/|f5|$=0.146.

In the second embodiment of the present five-piece optical lens system, the focal length of the first lens element 210, the second lens element 220 and the third lens element 230 combined is f123, the focal length of the five-piece optical lens system is f, and they satisfy the relation:

$|f123|/|f|$=1.852.

In the second embodiment of the present five-piece optical lens system, the focal length of the first lens element 210 is f1, the focal length of the second lens element 220 and the third lens element 230 combined is f23, and they satisfy the relation:

$|f1|/|f23|$=1.0783.

In the second embodiment of the present five-piece optical lens system, the focal length of the five-piece optical lens system is f, the distance from the object-side surface 211 of the first lens element 210 to the image plane 270 along the optical axis 280 is TL, and they satisfy the relation:

$|f/TL|$=0.0865.

The detailed optical data of the second embodiment is shown in table 3, and the aspheric surface data is shown in table 4, wherein the units of the radius of curvature, the thickness and the focal length are expressed in mm. In the tables 3 and 4, the surfaces 1 and 2 represent the object-side surface 211 and the image-side surface 212 of the first lens element 210, respectively, the surfaces 3 and 4 represent the object-side surface 221 and the image-side surface 222 of the second lens element 220, respectively, the surfaces 5 and 6 represent the object-side surface 231 and the image-side surface 232 of the third lens element 230, respectively, the surfaces 8 and 9 represent the object-side surface 241 and the image-side surface 242 of the fourth lens element 240, respectively, and the surfaces 10 and 11 represent the object-side surface 251 and the image-side surface 252 of the fifth lens element 250, respectively.

TABLE 3

| (Embodiment 2) f(focal length) = 1.34 mm, Fno = 2.4, 2ω = 160°. | | | | | | |
|---|---|---|---|---|---|---|
| Surface | | Curvature Radius | Thickness | Material | nd | vd |
| 0 | Object | Infinity | Infinity | | | |
| 1 | Lens 1 | 26.7009 | 1.05674 | Glass | 1.729 | 54.67 |
| 2 | | 3.93672 | 2.01719 | | | |
| 3 | Lens 2 | 25.7431(ASP) | 1.3437 | Plastic | 1.535 | 56 |
| 4 | | 0.92003(ASP) | 0.35203 | | | |
| 5 | Lens 3 | 1.55193(ASP) | 3.46508 | Plastic | 1.632 | 23 |
| 6 | | 8.50921(ASP) | 0.52379 | | | |
| 7 | Stop | Infinity | −0.0728 | | | |
| 8 | Lens 4 | 2.78381(ASP) | 1.76837 | Plastic | 1.535 | 56 |
| 9 | | −0.8902(ASP) | 0.08366 | | | |
| 10 | Lens 5 | −1.0545ASP) | 1.95215 | Plastic | 1.632 | 23 |
| 11 | | −2.1605(ASP) | 0.11004 | | | |
| 13 | IR-filter | Infinity | 0.3 | Glass | 1.5168 | 64.1673 |
| 14 | | Infinity | 1.635 | | | |
| 15 | IR-filter | Infinity | 0.55 | Glass | 1.5168 | 64.1673 |
| 16 | | Infinity | 0.455 | | | |
| 17 | Image | Infinity | | | | |

TABLE 2

| Aspheric Coefficients | | | | |
|---|---|---|---|---|
| | Surface # | | | |
| | 3 | 4 | 5 | 6 |
| k = | 17.91589 | −0.84779 | −0.53475 | −10.3908 |
| A = | −0.00537 | −0.11016 | −0.0326 | 0.086261 |
| B = | 0.000328 | 0.021145 | 0.006204 | 0.000755 |
| C = | −5.9E−06 | −0.00382 | −0.00045 | −0.00361 |
| D = | −2.4E−07 | 2.77E−05 | −0.00021 | 0.02645 |
| | Surface # | | | |
| | 8 | 9 | 10 | 11 |
| k = | 0.983636 | −1.08124 | −4.17953 | −8.47063 |
| A = | 0.110855 | 0.390382 | 0.057261 | −0.05632 |
| B = | −0.22591 | −0.48338 | −0.205 | 0.023317 |
| C = | 0.343388 | 0.242057 | 0.059436 | −0.00685 |
| D = | −0.21757 | −0.03048 | 0.0096 | 0.000911 |

TABLE 5

| | Embodiment 1 | Embodiment 2 |
|---|---|---|
| f | 0.61 | 1.34 |
| Fno | 2.8 | 2.4 |
| 2ω | 141 | 160 |
| \|f1\|/\|f2\| | 5.0064 | 3.553 |
| \|f2\|/\|f3\| | 0.571 | 0.727 |
| \|f3\|/\|f4\| | 2.4828 | 1.6495 |
| \|f4\|/\|f5\| | 0.519 | 0.146 |
| \|f123\|/\|f\| | 1.907 | 1.852 |
| \|f1\|/\|f23\| | 1.8115 | 1.0783 |
| \|f/TL\| | 0.1427 | 0.0865 |

It is to be noted that the tables 1-4 show different data from the different embodiments, however, the data of the different embodiments is obtained from experiments. Therefore, any product of the same structure is deemed to be within the scope of the present invention even if it uses different data. Table 5 lists the relevant data for the various embodiments of the present invention.

In the present five-piece optical lens system, the lens elements can be made of glass or plastic. If the lens elements are made of glass, there is more freedom in distributing the refractive power of the five-piece optical lens system. If the lens elements are made of plastic, the cost will be effectively reduced.

In the present five-piece optical lens system, if the object-side or the image-side surface of the lens elements is convex, the object-side or the image-side surface of the lens elements in proximity of the optical axis is convex. If the object-side or the image-side surface of the lens elements is concave, the object-side or the image-side surface of the lens elements in proximity of the optical axis is concave.

While we have shown and described various embodiments in accordance with the present invention, it should be clear to those skilled in the art that further embodiments may be made without departing from the scope of the present invention.

What is claimed is:

1. A five-piece optical lens system comprising, in order from an object side to an image side:

a first plastic lens element with a negative refractive power having an aspheric convex object-side surface and an aspheric concave image-side surface;

a second plastic lens element with a negative refractive power having an aspheric concave image-side surface and an aspheric convex object-side surface;

a third plastic lens element with a positive refractive power having an aspheric convex object-side surface and an aspheric concave image-side surface;

a stop;

a fourth plastic lens element with a positive refractive power having aspheric convex image-side surface and an aspheric convex object-side surface; and a fifth plastic lens element with a negative refractive power having aspheric concave object-side surface and an aspheric convex image-side surface.

2. The five-piece optical lens system as claimed in claim 1, wherein a focal length of the first lens element is f1, a focal length of the second lens element is f2, and they satisfy the relation:

$$2.5<|f1|/|f2|<6.$$

3. The five-piece optical lens system as claimed in claim 1, wherein a focal length of the second lens element is f2, a focal length of the third lens element is f3, and they satisfy the relation:

$$0.3<|f2|/|f3|<1.$$

4. The five-piece optical lens system as claimed in claim 1, wherein a focal length of the third lens element is f3, a focal length of the fourth lens element is f4, and they satisfy the relation:

$$1.0<|f3|/|f4|<3.0.$$

5. The five-piece optical lens system as claimed in claim 1, wherein a focal length of the fourth lens element is f4, a focal length of the fifth lens element is f5, and they satisfy the relation:

$$|f4|/|f5|<0.7.$$

6. The five-piece optical lens system as claimed in claim 1, wherein a focal length of the first lens element, the second lens element and the third lens element combined is f123, a focal length of the five-piece optical lens system is f, and they satisfy the relation:

$$1<|f123|/|f|<3.$$

7. The five-piece optical lens system as claimed in claim 1, wherein a focal length of the first lens element is f1, a focal length of the second lens element and the third lens element combined is f23, and they satisfy the relation:

$$0.5<|f1|/|f23|<2.3.$$

8. The five-piece optical lens system as claimed in claim 1, wherein a focal length of the five-piece optical lens system is f, a distance from the object-side surface of the first lens element to an image plane along an optical axis is TL, and they satisfy the relation:

$$|f|/|TL|<0.4.$$

* * * * *